(12) United States Patent
Marupaduga et al.

(10) Patent No.: US 10,129,762 B1
(45) Date of Patent: Nov. 13, 2018

(54) ADAPTIVE AZIMUTHAL SETTINGS FOR A TRANSMITTING-RECEIVING COMPONENT IN A WIRELESS TELECOMMUNICATIONS NETWORK

(71) Applicant: Sprint Communications Company L.P., Overland Park, KS (US)

(72) Inventors: Sreekar Marupaduga, Overland Park, KS (US); Andrew M. Wurtenberger, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/847,593

(22) Filed: Dec. 19, 2017

(51) Int. Cl.
*H04W 40/00* (2009.01)
*H04W 16/24* (2009.01)
*H04L 12/26* (2006.01)
*H04B 17/336* (2015.01)

(52) U.S. Cl.
CPC .......... *H04W 16/24* (2013.01); *H04B 17/336* (2015.01); *H04L 43/0888* (2013.01)

(58) Field of Classification Search
CPC ... H04L 43/0888; H04W 16/24; H04B 17/336
USPC ........................................................ 455/446
See application file for complete search history.

(56) References Cited

U.S. PATENT DOCUMENTS

| | | | |
|---|---|---|---|
| 5,491,833 A | 2/1996 | Hamabe | |
| 6,011,787 A * | 1/2000 | Nakano | H04W 48/12 370/335 |
| 6,470,195 B1 | 10/2002 | Meyer | |
| 8,712,403 B2 * | 4/2014 | Deng | H04W 24/02 370/338 |
| 9,635,617 B1 | 4/2017 | Marupaduga et al. | |
| 9,668,223 B2 * | 5/2017 | Abdelmonem | H04W 52/241 |
| 2004/0192393 A1 | 9/2004 | Ishihara et al. | |
| 2004/0203921 A1 | 10/2004 | Bromhead et al. | |
| 2008/0088521 A1 * | 4/2008 | Le | H01Q 3/16 343/818 |
| 2008/0273515 A1 * | 11/2008 | Stopler | H04W 72/046 370/344 |
| 2012/0184280 A1 | 7/2012 | Hunukumbure et al. | |
| 2013/0273921 A1 | 10/2013 | Kenington et al. | |
| 2015/0195001 A1 | 7/2015 | Barker et al. | |
| 2015/0222025 A1 * | 8/2015 | Song | H01Q 21/24 343/798 |
| 2015/0318945 A1 * | 11/2015 | Abdelmonem | H04L 5/006 370/329 |
| 2016/0066285 A1 * | 3/2016 | Shoji | H04W 52/38 455/522 |
| 2016/0192202 A1 * | 6/2016 | Calin | H04W 24/02 455/446 |

OTHER PUBLICATIONS

Office Action dated Sep. 11, 2018 in U.S. Appl. No. 15/875,800, 7 pages.

* cited by examiner

*Primary Examiner* — William Nealon

(57) ABSTRACT

Systems and methods for adjusting a transmitting-receiving (TR) component of a broadcast cell in a wireless telecommunications network are provided. In some aspects, the TR component can be adjusted along an azimuthal direction to shift the network signal from a first network footprint to a second network footprint. In some aspects, the TR component is adjusted along the azimuthal direction based on one or more network performance metrics.

20 Claims, 11 Drawing Sheets

ADAPTIVE AZIMUTHAL SETTINGS FOR A TRANSMITTING-RECEIVING COMPONENT IN A WIRELESS TELECOMMUNICATIONS NETWORK

TECHNICAL FIELD

The present technology relates to systems and methods for adjusting an azimuthal setting of a transmitting-receiving component in a wireless telecommunications network.

SUMMARY

This summary is intended to introduce a selection of concepts in a simplified form that are further described below in the detailed description section of this disclosure. This summary is not intended to identify key or essential features of the claimed subject matter, nor is it intended to be used as an aid in determining the scope of the claimed subject matter.

At a high level, the present disclosure describes adjusting or changing an azimuthal setting of a transmitting-receiving (TR) component in a wireless communications network. In some aspects, it may be advantageous to adjust an azimuthal setting of a TR component, such as a TR component of a broadcast cell, to shift or steer the network signal from a first network footprint of coverage to a second network footprint of coverage. For example, active state user equipment (UE) may experience reduced network performance values based on intra-cell interference. In various aspects, to increase the performance of these UEs, a TR component of a broadcast cell (or in some aspects, an adjacent TR component) may be adjusted in the azimuthal direction to shift or steer the network signal from a first network footprint to a second network footprint. In such aspects, this may reduce the intra-cellular interference and increase the performance of active state UEs. In some aspects, it may be advantageous to adjust the TR component in the azimuthal direction to steer the network signal from a first network footprint to a second network footprint that exhibits a reduced sector power ratio (SPR) compared to an SPR of the first network footprint.

Accordingly, in one aspect, a method of adjusting an azimuthal setting of a transmitting-receiving (TR) component is provided. The method includes providing, via a TR component in a first azimuthal position, a network signal, where the network signal provided by the TR component in the first azimuthal position is present in a first network footprint. The first network footprint includes a first portion inside a designated coverage zone and a second portion outside the designated coverage zone, and a ratio of the second portion to the first portion defines a first sector power ratio (SPR). The method may further include identifying at least one active state user device connected to the network signal provided by the TR component. Further, the method may include determining a performance of the at least one active state user device, the performance including one or more of a throughput and a signal-to-interference-plus-noise ratio (SINR). The method can also include, in response to the determining the performance of the at least one active state user device, adjusting the TR component along an azimuthal direction to a second azimuthal position, so that the network signal provided by the TR component in the second azimuthal position is present in a second network footprint. The second network footprint includes a third portion inside the designated coverage zone and a fourth portion outside the designated zone, where a ratio of the fourth portion to the third portion defines a second SPR, and where the throughput, the SINR, or both, of the at least one active state user device is increased.

In another aspect, a method of adjusting an azimuthal setting of a transmitting-receiving (TR) component is provided. The method includes providing, via a TR component in a first azimuthal position, a network signal, wherein the network signal provided by the TR component in the first azimuthal position is present in a first network footprint, the first network footprint including a first portion inside a designated coverage zone and a second portion outside the designated coverage zone, where a ratio of the second portion to the first portion defines a first sector power ratio (SPR). The method can also include identifying a plurality of active state user devices connected to the network signal provided by the TR component. Additionally, the method can include determining a performance of each of the plurality of active state user devices, the performance including a signal-to-interference-plus-noise ratio (SINR). The method can also include determining whether (1) the SINR of each of the plurality of active state user devices; (2) an average SINR calculated from the SINR of each of the plurality of the active state user devices; or (3) both, is below an SINR threshold value. The method may also include adjusting the TR component along an azimuthal direction to a second azimuthal position, so that the network signal provided by the TR component in the second azimuthal position is present in a second network footprint, the second network footprint including a third portion inside a designated coverage zone and a fourth portion outside the designated coverage zone, where a ratio of the fourth portion to the third portion defines a second SPR, and where the second network footprint results in increase in the SINR of at least a portion of the plurality of the active state user devices.

In yet another aspect, a system for adjusting an azimuthal setting of a transmitting-receiving (TR) component in a wireless telecommunications network is provided. The system includes a TR component adapted to be shiftable in an azimuthal direction from a first azimuthal position to a second azimuthal position, where, when the TR component is in the first azimuthal position, a network signal provided by the TR component is present in a first network footprint. The first network footprint includes a first portion inside a designated coverage zone and a second portion outside the designated coverage zone, where a ratio of the second portion to the first portion defines a first sector power ratio (SPR). When the TR component is in the second azimuthal position, the network signal provided by the TR component is present in a second network footprint, the second network footprint includes a third portion inside the designated coverage zone and a fourth portion outside of the designated coverage zone, and where a ratio of the fourth portion to the third portion defines a second SPR. The system further includes one or more processors and a non-transitory storage media storing computer-useable instructions. Execution by the one or more processors of the computer-useable instructions cause the one or more processors to: determine a performance of at least one active state user device connected to the network signal, the performance including one or more of a throughput and a signal-to-interference-plus-noise ratio (SINR), determine whether the throughput is below a throughput threshold value or the SINR is below a SINR threshold value, in response to determining that the throughput is below the throughput threshold value or the SINR is below the SINR threshold value, cause the TR component to shift from the first azimuthal position to the second azimuthal position.

Additional objects, advantages, and novel features of the technology will be set forth in part in the description which follows, and in part, will become apparent to those skilled in the art upon examination of the following or learned by practice of the technology.

BRIEF DESCRIPTION OF THE DRAWINGS

The present technology is described in detail below with reference to the attached drawing figures, wherein.

DETAILED DESCRIPTION

Figure 1:
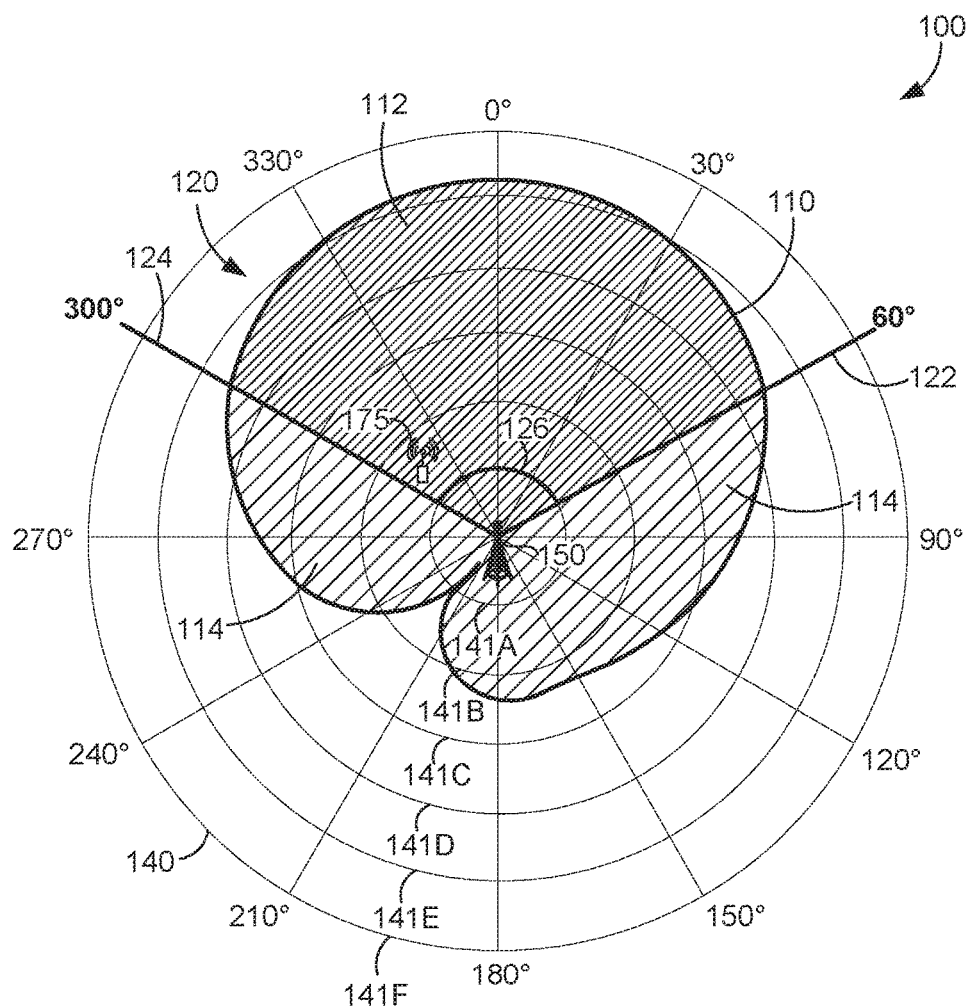
FIG. 1 depicts a network signal footprint from a broadcast cell in a wireless telecommunications network, in accordance with aspects described herein.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly described and required.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:
CDMA Code Division Multiple Access
EMS Element Management System
eNodeB Evolved Node B
GSM Global System for Mobile Communications
LTE Long-Term Evolution
TDMA Time Division Multiple Access
RF Radio-Frequency
SINR Signal-to-Interference-Plus-Noise Ratio
SNR Signal-to-Noise Ratio
SPR Sector Power Ratio
TR Transmitting-Receiving
UE User Equipment Further, various technical terms are used throughout this description. An illustrative resource that fleshes out various aspects of these terms can be found in Newton's Telecom Dictionary, 27th Edition (2012).

At a high level, the present application is directed to adjusting the azimuthal setting of a TR component that provides a network signal. In some aspects, adjusting the azimuthal settings of the TR component may steer the network signal from a first footprint of coverage area to a second footprint of coverage area. In some aspects, the described technology may be utilized to increase performance of UEs connected to the network signal provided by the TR component and/or of UEs actively sending or receiving data via the network signal. In certain aspects, performance of UEs connected to the network signal provided by the TR component may be affected by intra-cell interference, e.g., from network signals from one or more adjacent TR components associated with the same broadcast cell. To increase the performance of these UEs, the present technology may adjust, e.g., mechanically shift, a TR component emitting the network signal in azimuthal direction to increase the performance of these UEs, e.g., as evidenced by increasing the throughput, increasing the SINR, and/or altering a sector power ratio. In some aspects, this reduces the amount of overlap between intra-cellular network signals emitted from TR components of the same broadcast cell.

Turning now to the figures, and FIG. 1 in particular, a network footprint 110 from a broadcast cell 150 in a wireless telecommunications network 100 is depicted. The network footprint 110 may be an area covered by a network signal that is transmitted from a TR component (not shown) of broadcast cell 150. The network signal may comprise common signal characteristics, such as channels, frequencies, frequency bands, encoding, and the like. The network signal is discussed in further detail below with reference to FIG. 4.

As illustrated, FIG. 1 also depicts a designed coverage zone 120. In some aspects, such as that shown in FIG. 1, the network footprint 110 comprises an area inside the designated coverage zone, area 112, and an area outside the designated coverage zone, area 114. As discussed further below, the ratio of the area of the network signal outside the designated coverage zone, area 114, to the area of the network signal inside the designated coverage zone, area 112, is referred to as the sector power ratio (SPR), expressed as a percent, i.e., the ratio multiplied by 100. In some embodiments, the designated coverage zone 120 is represented or defined by an area between two theoretical boundary lines 122 and 124 beginning at a TR component of a broadcast cell 150 and extending away from the TR component, where the theoretical boundary lines are separated by an angle 126. The TR component and the broadcast cell 150 are further described below with reference to FIG. 3. It will be understood that the two theoretical boundary lines 122 and 124 are theoretical in the sense that they have no physical existence and are used only to define boundaries for the designated coverage zone 120. Using FIG. 1, for example, the two theoretical boundary lines 122 and 124 are separated by a 120° angle 126, where a first theoretical boundary line 122 is represented at 60° to the right of 0° on polar coordinate system 140 and a second theoretical boundary line 124 is represented at 300°, which is 60° to the left of 0° on the polar coordinate system 140. As such, FIG. 1 illustrates the designated coverage zone 120 that is between the first theoretical boundary line 122 and the second theoretical boundary line 124, separated by angle 126 that is 120°. Angle 126, however, may be defined to be larger or smaller than that shown in FIG. 1. For example, angle 126 may be defined as 90°, which would make the designated coverage zone 120 smaller. In another example, angle 126 may be defined as 180°, which would make the designated coverage zone 120 larger.

It will be understood that the polar coordinate system 140 is used to illustrate a geographical area, and that the various segments of the polar coordinate system 140 are used to illustrate and define relative locations or areas within the geographical area. For instance, with reference to FIG. 1, the network footprint 110 is illustrated as covering a relative portion of the geographical area represented by the polar coordinate system 140. The polar coordinate system 140 is shown having a series of concentric circles 141A-141F extending outward from a center, which may be located or defined at or near the broadcast cell 150. In some aspects, the series of concentric circles 141A-141F represents a distance, such as the distance from the broadcast cell 150. In some aspects, the distance may be measured in meters. In some aspects, the distance between each circle of the series of concentric circles may be represented by a power value supplied to the broadcast cell 150 or a TR component of the broadcast cell (such components are further described below), which may be measured in decibels relative to a milliWatt (dBm). For example, the distance from broadcast cell 150 to circle 141A may be represented by 10 dBm. The distance from circle 141A to circle 141B may also be representative of 10 dbm, and so forth. Then, in this example, the distance from broadcast cell 150 to 141B may be represented or described as 20 dBm.

With this in mind, user equipment (UE) 175 depicted in FIG. 1 may have a location relative to the broadcast cell 150 that may be defined based on a power value supplied to the broadcast cell 150. In some aspects, the power value may be based on an output power supplied per carrier. For example, UE 175 is illustrated having a distance represented by 10-20 dBm. Certain UEs that are a predefined distance from a broadcast cell, such as broadcast cell 150, may be cell-near UEs. For example, in a 52 dBm carrier scenario, cell-near UEs may be at or between 40 and 46 dBm.

In the same or alternative aspects, cell-near UEs can be defined based on a specific locational position of the UE relative to the broadcast cell 150, such as the UE being within a predefined area adjacent or near the broadcast cell. For instance, the predefined area that can identify cell-near UEs could be defined by latitudinal and longitudinal coordinates such that UEs having coordinates within a defined area are considered as cell-near UEs. Additionally or alternatively, cell-near UEs can be identified based on UE received power, e.g., a UE that is considered cell near can exhibit a network signal strength of about −90 dBm or greater, about −80 dBm or greater, about −70 dBm or greater, or about −60 dBm or greater. In another aspect, cell-near UEs can be identified based on a round-trip delay time, i.e., the length of time it takes for a signal to be sent to the UE from the broadcast cell plus the length of time it takes for an acknowledgment of that signal to be received at the broadcast cell. In some aspects, the round-trip delay time for cell-near UEs may be at or between 40-70 milliseconds (ms).

Figure 2:
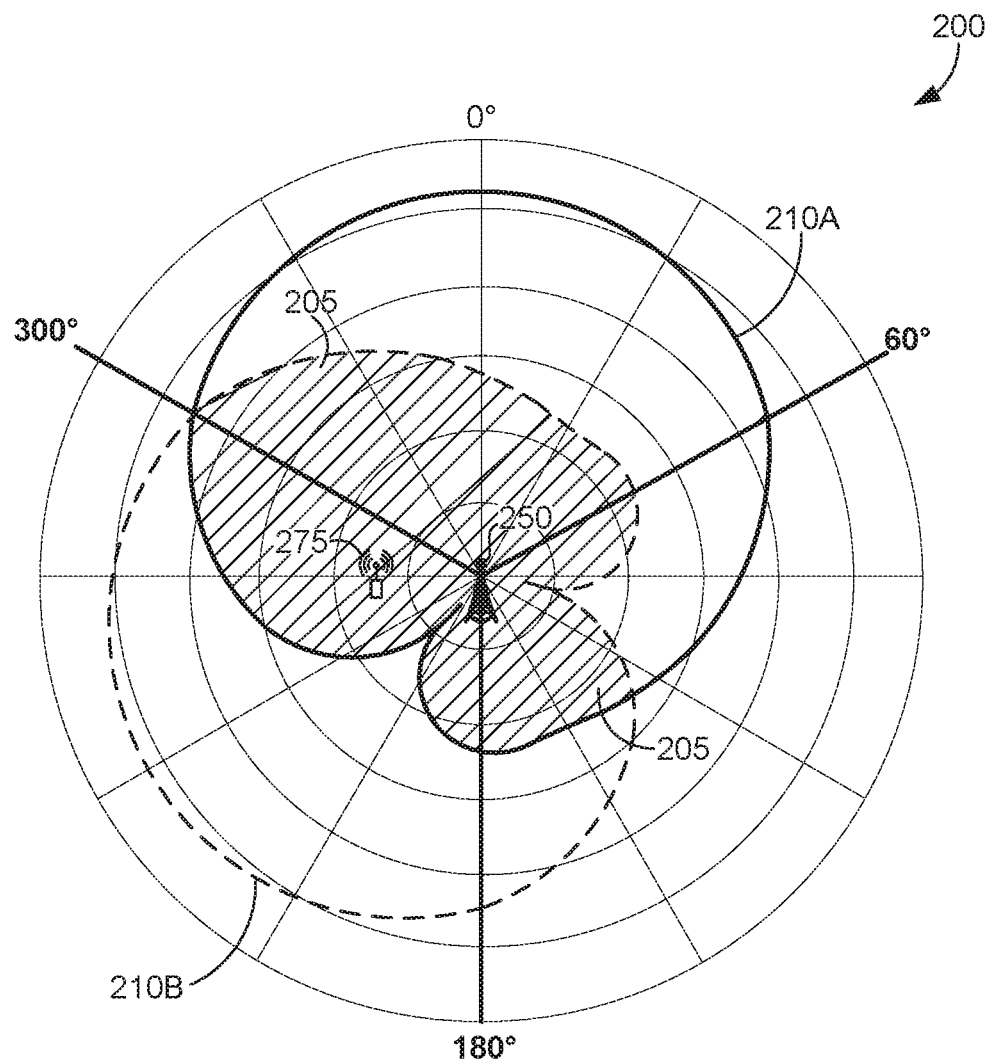
FIG. 2 depicts two network signal footprints from a broadcast cell in a wireless telecommunications network, in accordance with aspects described herein.

With reference now to FIG. 2, an example an area of a wireless telecommunications network 200 having two example network signal footprints, 210A and 210B, associated with a broadcast cell 250 is shown. In aspects, each network footprint 210A and 210B depicted in FIG. 2 may result from a network signal emitted from different TR components (discussed in more detail below) located at broadcast cell 250. It should be understood that, while only two network footprints 210A and 210B are shown, broadcast cell 250 may be configured to emit any number of network footprints of a network signal. In one aspect, each TR component of a broadcast cell may emit a network signal in a network footprint; thus, the number of network footprints of the network signal may be the same as the number of TR components at the broadcast cell associated with the network signal and the TR components. For example, broadcast cell 250 may could also emit three, four, or more network footprints of a network signal. FIG. 2 depicts two network footprints 210A and 210B for simplicity in describing the technology. Additionally, it should be further understood that the shape or geographic area covered by network footprints 210A and 210B is not limited to what is illustrated in FIG. 2, or in any of the other figures. There are a number of factors or variables that may be manipulated to change the shape or size of network footprints 210A and 210B, which are generally known in the art and are not described herein.

With continued reference to FIG. 2, network footprints 210A and 210B cause an overlap of coverage area 205. The overlap of coverage area 205 may occur where one network footprint of the network overlaps with another network footprint of the network. In some aspects, overlapping footprints may be from network signals emitted by different TR components at a single broadcast cell, such as broadcast cell 250. In such aspects where the overlapping network footprints are emitted at the same broadcast cell, the overlapping area may results in intra-cell interference for UEs located in the overlapping area. For example, UE 275 is illustrated as being located within the overlap of coverage area 205. In some aspects, overlapping network footprints may be from network signals emitted at different broadcast cells, which is not illustrated in FIG. 2. In aspects where the overlapping network footprints are emitted at different broadcast cells, the overlapping area may result in inter-cell interference for UEs located in the overlapping area.

In general, overlaps in network footprints may be reduced during the initial planning and setup of a wireless communications network because the overlap in network coverage may reduce performance of UEs located in the overlapping area. In certain aspects, after the setup of a broadcast cell, it may be advantageous to adjust one or more components of the broadcast cell in order to modify or shift one or more network footprints of one or more network signals. For example, one or more TR components of the broadcast cell may be adjusted in an azimuthal direction, which may in turn steer a network footprint emitted from one of the TR components. In such aspects, adjusting one or more broadcast cell components (e.g., to modify or shift one or more network signal footprints) can be done to affect the performance of one or more active UEs in the wireless communications network or particular areas of the wireless communications network.

Performance or network performance of UEs in the wireless communications network may be measured or determined in several ways. For example, a throughput or signal-to-interference-plus-noise ratio (SINR) for one or more UEs may be measured to determine the performance of UEs that are connected to, or sending or receiving information from, a network signal provided by a broadcast cell of interest. It should be understood that UEs connected to, or sending or receiving information from, a network signal can be referred to as active state UEs, though for ease of discussion, these active state UEs may be also referred to as UEs. In various aspects, a higher throughput and/or a higher SINR can indicate better performance for a UE. Throughput, for example, is a measure of the amount of data that can be transferred to and from (upload and download) a UE to the network, and is typically expressed as a number of bits per second. As such, a higher number of bits per second is indicative of better UE performance. SINR, for example, is the power of a network signal of interest relative to the sum of an interference power (such as from other network signals) and the power of background noise, often expressed in decibels (dB). Thus, a higher SINR indicates better performance of the UE, as there is less background noise relative to the desired signal. Each of these performance metrics, along with others known in the art (such as signal-to-noise ratio, spectral bandwidth, symbol rate, digital bandwidth, channel utilization, link spectral efficiency, bit-error rate, latency, and the like), may be utilized by this technology and are intended to be a part of this disclosure. Furthermore, in various aspects, the network performance of a number of UEs (such as a plurality of UEs) connected to a network or in a particular area of the network may also be measured or determined. In such aspects, an average network performance metric or value may be determined based on the individual performance metrics of the individual UEs in the plurality of UEs. In one aspect, these network performance metrics may be measured and/or determined by an element management system associated with, or more generally, in communication with, the broadcast cell, such as broadcast cell 250, or by a server at a remote location and in communication with the broadcast cell.

Figure 3:
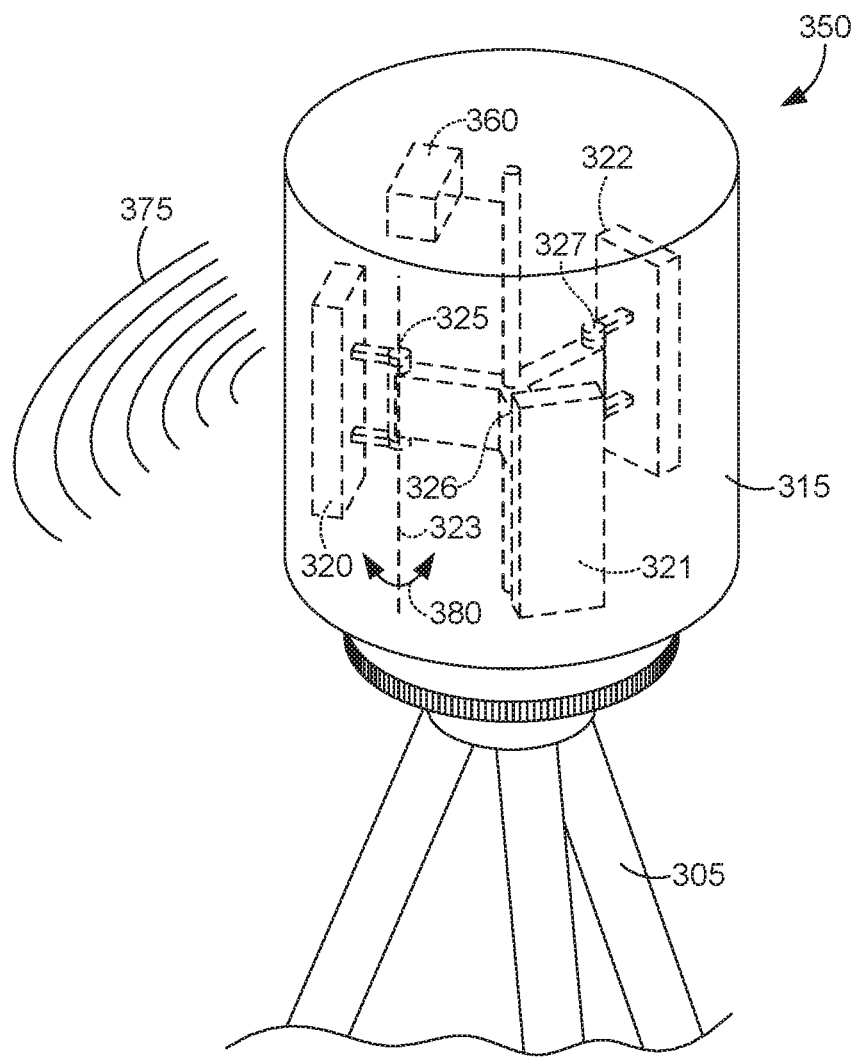
FIG. 3 depicts an example broadcast cell, in accordance with aspects described herein.

Referring now to FIG. 3, one example of a broadcast cell 350 is depicted. The term "broadcast cell" as used herein may include any base station, access point, or access node in a network to which a mobile communication device may attach to connect to a wireless communication network. The broadcast cell 350 of FIG. 3 depicts only a selection of components for clarity and explanatory purposes, and more or fewer components, as well as alternative arrangements of components and/or functionality of components, such as a distributed architecture of components, are possible and contemplated within the scope of this disclosure. As illustrated, the broadcast cell 350 includes a base 305, a housing 315, and a plurality of TR components 320, 321, and 322. It should be understood that a broadcast cell can have any number of TR components (such as four, six, eight, or ten TR components), and the three TR components 321-322 of broadcast cell 350 are just one example. The housing 315 can provide physical protection to components of the broadcast cell 350, while being transparent to a network signal 375, which may be emitted or received by any TR component of the plurality of TR components 320-322. In some instances, the housing 315 may be optional. The term TR component as used herein may include any antenna, antenna system, or other component configured to broadcast and/or receive a wireless communications signal over a network to communicate with a UE, such as a mobile communication device. Each TR component 320, 321, or 322 of the plurality of TR components 320-322 can be shiftable relative to one or more other portions of the broadcast cell 350. For instance, each TR component 320, 321, or 322 may be shiftable via the use of movement mechanisms 325, 326, and 327, respectively. It will be appreciated that systems and methods for mechanically moving or shifting TR components 320-322 utilizing the movement mechanisms 325-327 are known in the art. Any such system or method for mechanically adjusting TR components 320-322 is contemplated within the scope of this disclosure.

In aspects, the TR components may be shiftable in an azimuthal direction. For example, movement mechanism 325 can cause TR component 320 to rotate around or about axis 323 to shift TR component 320 in an azimuthal direction. As used herein, to move or shift a TR component in an azimuthal direction means to shift or rotate the TR component about or around a vertical or y-axis (e.g., axis 323). In such aspects, the shifting of a TR component in the azimuthal direction does not include tilting the TR component up or down (e.g., towards the ground or away from the ground). In certain aspects, a TR component may be shifted in an azimuthal direction a specified amount as can be measured on a polar coordinate system. For instance, in such aspects, a TR component may have a first azimuthal position, e.g., so that the TR component would be facing 0° on a polar coordinate system, when the TR component is positioned at the center of the polar coordinate system. The TR component can be shifted in an azimuthal direction to a second azimuthal position such that the TR component is facing, e.g., 5° on the polar coordinate system. In various aspects, the TR component can be shifted at least about 1°, at least about 2°, at least about 5°, at least about 10°, at least about 15°, or at least about 25°, and/or less than about 50°, less than about 40°, less than about 30°. In some aspects, the TR component may be shifted in the azimuthal direction to any degree or range determined by a wireless telecommunications provider, for example, to improve network performance of one or more UEs, to adjust the SPR of a network signal emitted by the TR component, or for any other purpose determined by the wireless telecommunications provider.

In aspects, adjusting a TR component, e.g., TR component 320, can change the position of an emitted network signal, such as the network signal 375, relative to a broadcast cell associated with the TR component. This shifting of the network signal or network signal footprint is discussed further below.

In various aspects, to facilitate the azimuthal shifting or adjusting of TR components 320-322, the broadcast cell 350 of FIG. 3 can include a communication and control component 360 that is configured to communicate with one or more of the movement mechanisms 325-327. Using FIG. 3 as an example, the communication and control component 360 may send a signal to the movement mechanism 325 to adjust the TR component 320 in an azimuthal direction, which may also shift a network signal emitted from the TR component 320. In some aspects, the communication and control component 360 may directly control the mechanical movement of 320 by mechanically manipulating or moving movement mechanism 325.

In one or more aspects, the communication and control component 360 may facilitate the movement of the TR components 320-322 in response to receiving a communication from, for example, an element management system (EMS), which is further described in connection with FIG. 4. In some aspects, the received communication may comprise instructions indicating the direction and the degree in which to move the TR components 320-322, for example, the degree in which one of the TR components 320-322 shifts in an azimuthal direction. In some aspects, the communication and control component 360 is configured to communicate network information (e.g., from active state UEs) received at TR components 320-322. For example, this information may be communicated to the EMS, an example of which is discussed below.

Figure 4:
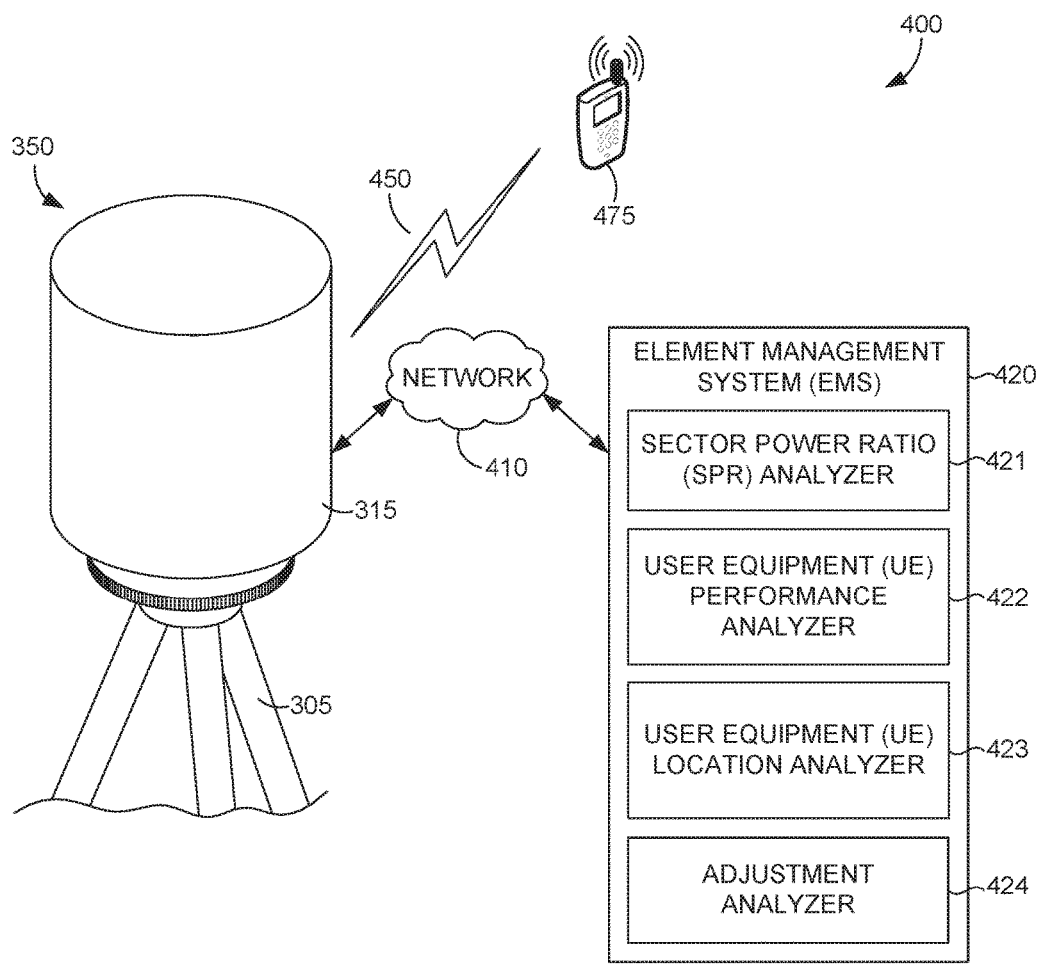
FIG. 4 depicts the example broadcast cell of FIG. 3 in communication with an element management system, in accordance with aspects described herein.

Turning next to FIG. 4, the broadcast cell 350 of FIG. 3 is shown with selected components removed for simplicity in describing portions of the technology. The broadcast cell 350 (or components thereof) is shown in communication with UE 475 through a network signal 450 and in communication with an EMS 420 through a network 410. In general, UEs, such as UE 175 in FIG. 1 and UE 475 in FIG. 4, may be any mobile or non-mobile user device communicating or having the capacity to communicate with a wireless telecommunications network or other components not internal to the UE. As discussed above, in some aspects, UEs communicating with the wireless telecommunications network are designated as active state UEs. In some aspects, UEs that have the capacity to communicate but are not actively communicating with the wireless telecommunications network are non-active UEs. In some embodiments, UEs may make and receive telephone calls over a radio link while moving around wide geographic areas. In addition, UEs may support a wide variety of other services (e.g., text messaging, MMS, e-mail, Internet access, short-range wireless communication, applications, and gaming).

In some aspects, UEs communicate with the wireless network by way of the network signal 450. The network signal 450 may be a short-range connection, a long-range connection, or a combination of both a short-range and a long-range wireless telecommunications connection. References to "short" and "long" types of connections are not meant to convey a spatial relationship between two devices. Rather, short range and long range connections should be understood as different categories, or types, of connections (e.g., a primary connection and a secondary connection). A short-range connection may include a Wi-Fi connection to a device (e.g., mobile hotspot) that provides access to a wireless communications network, such as a WLAN connection using 802.11 protocol. A long-range connection may include a connection using one or more of CDMA, GSM, TDMA, LTE, and 802.16. UEs may connect to the wireless communications network through different types of cells. In some aspects, UEs can use femtocells or picocells such that they communicate through a broadband Internet connection such as a digital subscriber line or cable.

As illustrated in FIG. 4, the EMS 420 may communicate with the broadcast cell 350, or any components thereof, via network 410. The network 410 may include, without limitation, one or more local area networks (LANs) and/or wide area networks (WANs). In example implementations, the network 410 comprises the Internet and/or a cellular network, amongst any of a variety of possible public and/or private networks.

With reference now to the EMS 420, as depicted in FIG. 4, the EMS 420 includes a sector power ratio (SPR) analyzer 421, a UE performance analyzer 422, a UE location analyzer 423, and an adjustment analyzer 424. It will be recognized that functions are described as being performed by one or more entities, which may be carried out by hardware, firmware, and/or software. It should be understood that this and other arrangements described are only provided as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. For instance, some functions may be carried out by a processor executing instructions stored in memory. An example computing device suitable for performing aspects of this technology is further described with respect to FIG. 7.

SPR analyzer 421 generally determines an SPR associated with one or more network footprints, such as network footprints 210A and 210B of FIG. 2. As discussed above, the SPR can be defined as the ratio of the area of the network signal footprint outside the designated coverage zone to the area of the network signal footprint inside the designated coverage zone. Using FIG. 1 as an example, the SPR for the network footprint 110 would be defined as the ratio of the area outside a designated coverage zone, area 114, to the area inside the designated coverage zone, area 112. SPR analyzer 421 may estimate the coverage area of a network signal (the network footprint) based on certain network variables, such as the power supplied to a TR component, the type of network signal emitted by the TR component, and the like. In some aspects, the SPR analyzer 421 may determine the network footprint by measuring performance of active state UEs in the coverage area. Other methods for measuring the network footprint are generally known in the art and are contemplated within the scope of this description.

To determine an SPR for a network footprint, in some aspects, SPR analyzer 421 compares the network footprint to a designated coverage zone, and determines the ratio of an area of the network footprint outside the designed coverage zone to an area of the network footprint inside the designated coverage zone. Looking back to FIG. 1 again as an example, the designated coverage zone 120 is represented as the area of the wireless communications network between the theoretical boundary lines at 300° and 60°. In some aspects, SPR analyzer 421 determines the SPR for the network footprint by determining a ratio of the area outside the designated coverage zone, area 114, to the area inside the designated coverage zone, area 112, for the network footprint 110.

In various aspects, the UE performance analyzer 422 can determine one or more network performance metrics for active state UEs in a wireless telecommunications network. For example, the UE performance analyzer 422 may determine one or more performance metrics, such as throughput or SINR, for UEs communicating with a network signal. In aspects, the UE performance analyzer 422 determines one or more performance metrics for active UEs within a network footprint. For example, the upload and/or download speeds of UE 475 communicating with the broadcast cell 350 through network signal 450 may be measured to determine throughput for the UE 475. Similarly, UE performance analyzer 422 may measure or determine the value of desired signal to the value of background noise for the UE 475 to determine the SINR for the UE 475. While the performance metrics are described here with respect to the UE 475, it should be understood that the performance metrics can be measured for a plurality of active state UEs. In some aspects, the performance metrics may be represented as an average for the plurality, or as a particular measurement for a specific UE. In some aspects, UE performance analyzer 422 determines UE performance prior to, during, or after adjusting or shifting a TR component, or any combination thereof. For example, in aspects, UE performance analyzer 422 may determine the performance before and after shifting a TR component in an azimuthal direction to determine if the network performance of a UE has improved.

The UE location analyzer 423 generally determines and/or identifies the number of UEs and/or the location of UEs within a wireless telecommunications network. In some aspects, UE location analyzer 423 determines the number of active state UEs in a particular area of the wireless telecommunications network, which may include a particular area of a network footprint, such as an area defined as cell-near. In some aspects, the UE location analyzer 423 may determine the location of UE 475 by receiving latitude and longitude information from the UE 475. Further aspects of determining cell-near UEs are discussed above.

In various aspects, the UE location analyzer 423 may determine the number of UEs by determining the number of active state UEs that are communicating with the broadcast cell 350 or a TR component thereof. In some aspects, the UE location analyzer 423 may determine the number of UEs in a particular area by determining the number of active UEs communicating through the network signal 450 with the broadcast cell 350 or a TR component thereof that have a latitude and longitude within the particular area. Other methods known in the art for determining or identifying the number and location of UEs in a wireless communications network may be employed and are contemplated within the scope of this disclosure.

UE adjustment analyzer 424 generally determines the adjustment to be made to one or more TR components of a broadcast cell, such as broadcast cell 350, in order to adjust or shift the network signal emitted by a TR component or a neighboring TR component. In some aspects, the UE adjustment analyzer 424 may communicate with the broadcast cell 350 or components thereof via network 410. For example, UE adjustment analyzer 424 may communicate instructions to a communication and control component of the broadcast cell. In some aspects, the communication and control component may facilitate adjusting one or more TR components by communicating the instructions in a manner such that a movement mechanism may adjust the TR component in accordance with the instructions. In some aspects, the UE adjustment analyzer 424 may communicate directly with the movement mechanism to adjust the TR components. For example, with reference to FIG. 3, communication and control component 360 may receive from UE adjustment analyzer 424 instructions to adjust TR component 320. For example, the instructions may be for adjusting the TR component 320 by a certain number of degrees in an azimuthal direction as discussed further above with respect to FIG. 3.

In one or more aspects, the UE adjustment analyzer 424 may determine that one or more TR components should be adjusted based on predetermined times or adjusted dynamically in response to measuring or determining UE performance for one or more UEs. The UE adjustment analyzer 424 may make determinations to adjust TR components continuously, periodically, or as needed. For example, times may be predetermined for adjusting one or more TR components to shift the network signal footprint in a desired azimuthal direction. Times may be predetermined based on historical patterns of user performance in an area or areas of the wireless telecommunications network. For example, if during the day, certain areas have an increase number of UEs during typical business hours and a decrease in the number of UEs after typical business hours, a predetermined adjustment may be based on this historical increase or decrease of UEs in the area. In some aspects, a wireless telecommunications provider may determine times to adjust the TR components and save this in a data store (not illustrated) in communication with and accessible to the UE adjustment analyzer 424. For example, a sporting event scheduled for a Sunday afternoon may attract a larger number of people than would normally be located with a particular area of a wireless telecommunications network, and as such, there may be an increase in the number of UEs in the area of the sporting event at the time of the event. Thus, the wireless communications carrier may input predetermined times to adjust the TR component to shift the network signal footprint to provide better network performance of the UEs in the area of the sporting event.

In some aspects, UE adjustment analyzer 424 may determine an adjustment for one or more TR components based on determined or measured UE network performance. In aspects, UE network performance may be reduced, particularly if the UE is cell-near, because of overlapping network footprints emitted from different TR components of the same broadcast cell (intra-cell interference). In various aspects, when measured network performance metrics are above or below defined threshold amounts, the UE adjustment analyzer 424 can determine that one or more TR components should be adjusted to increase performance of active state UEs. For example, the UE adjustment analyzer 424 may determine that one or more TR components should be adjusted based on one or more active state UEs having a throughput below a threshold value. In some aspects, the UE adjustment analyzer 424 may determine that one or more TR components should be adjusted based on one or more active state UEs having an SINR below a threshold value. In some aspects, a determination that one or more TR components should be adjusted is made based on both the throughput being below the threshold value and the SINR below the threshold value. Thresholds may be defined for other performance metrics, and in some aspects, adjustment determinations may be made on any one of the other performance metrics or a combination of any of the performance metrics.

In various aspects, a threshold value for throughput for one or more active state UEs may be 15 megabits per second (Mbps) for each of the one or more active state UEs (or an average of a group of measured active state UEs). In some aspects, the threshold value for throughput for one or more active state UEs may be at or less than: 10 Mbps, 20 Mbps, 25 Mbps, 30 Mbps, 35 Mbps, 40 Mbps for each of the one or more active state UEs (or an average of a group of measured active state UEs). In a more general sense, the throughput threshold may be any predefined threshold set by a wireless telecommunications provider for a particular purpose. In one or more aspects, a throughput threshold predefined by the wireless telecommunications provider may be based on a channel bandwidth of the network signal. For instance, as technology improves, the wireless telecommunications provider may change the throughput threshold to better reflect the device performance of the improved technology. Similarly, threshold values may be defined for an SINR of one or more active state UEs (or an average of a group of measured active state UEs). In some aspects, the threshold value for SINR may be 15 dB. In some aspects the threshold value for the SINR may be at or less than 20 dB, 25 dB, 30 dB, 35 dB, 40 dB, and so forth. In a more general sense, like the throughput threshold, the SINR threshold may be any predefined threshold set by the wireless telecommunications provider.

In various aspects, the UE adjustment analyzer 424 can determine that one or more TR components should be adjusted based on an SPR of a network footprint. As previously described, a high SPR may indicate lower performance for cell-near UEs. In some aspects, SPR analyzer 421 may indicate that a network footprint has a particular SPR when the TR component is in a particular position. The UE adjustment analyzer 424 may determine that one or more TR components should be adjusted to steer the network signal along an azimuthal direction to a second footprint having a lower SPR. In some aspects, the SPR analyzer 421 continuously or intermittently determines the SPR of the footprint as adjustment is being made to determine a lower SPR or the lowest attainable SPR for the network footprint at that time. In some aspects, SPR analyzer 421 may determine that a second footprint of the network signal would have a lower SPR than a current first footprint. The UE adjustment analyzer 424 may determine the degree and azimuthal direction to adjust one or more of the TR components to shift the network signal from the first footprint to the second footprint having the lower SPR. In some aspects, the UE adjustment analyzer 424 may determine that one or more TR components should be adjusted based on the SPR being above a threshold value. In one aspect, the threshold value for the SPR can be at or less than: 8%, 10%, 13%, 16%, 20%, 25%, 30%, or 35%. In some aspects, the UE adjustment analyzer 424 adjusts the TR component, e.g., along an azimuthal direction or plane, to reduce the SPR of the network footprint below the threshold SPR value.

In various aspects, the adjustments determined by the adjustment analyzer 424 may be based on network performance metrics for a plurality of UEs in the wireless telecommunications network. For instance, the UE adjustment analyzer 424 may determine that one or more TR components needs to be adjusted in an azimuthal direction to increase performance for the UEs in a particular area of the wireless telecommunications network.

Figure 5A:
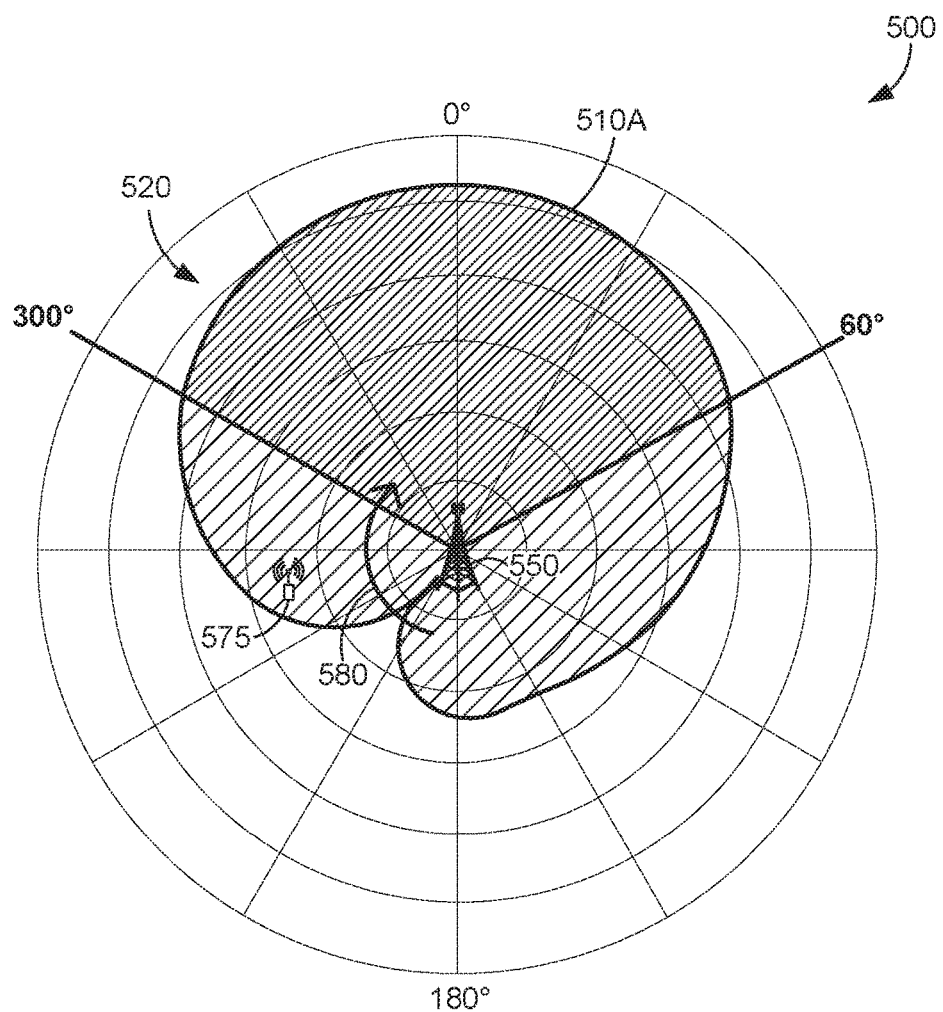
FIG. 5A depicts a network signal footprint from a broadcast cell in a wireless telecommunications network, in accordance with aspects described herein.
Figure 5B:
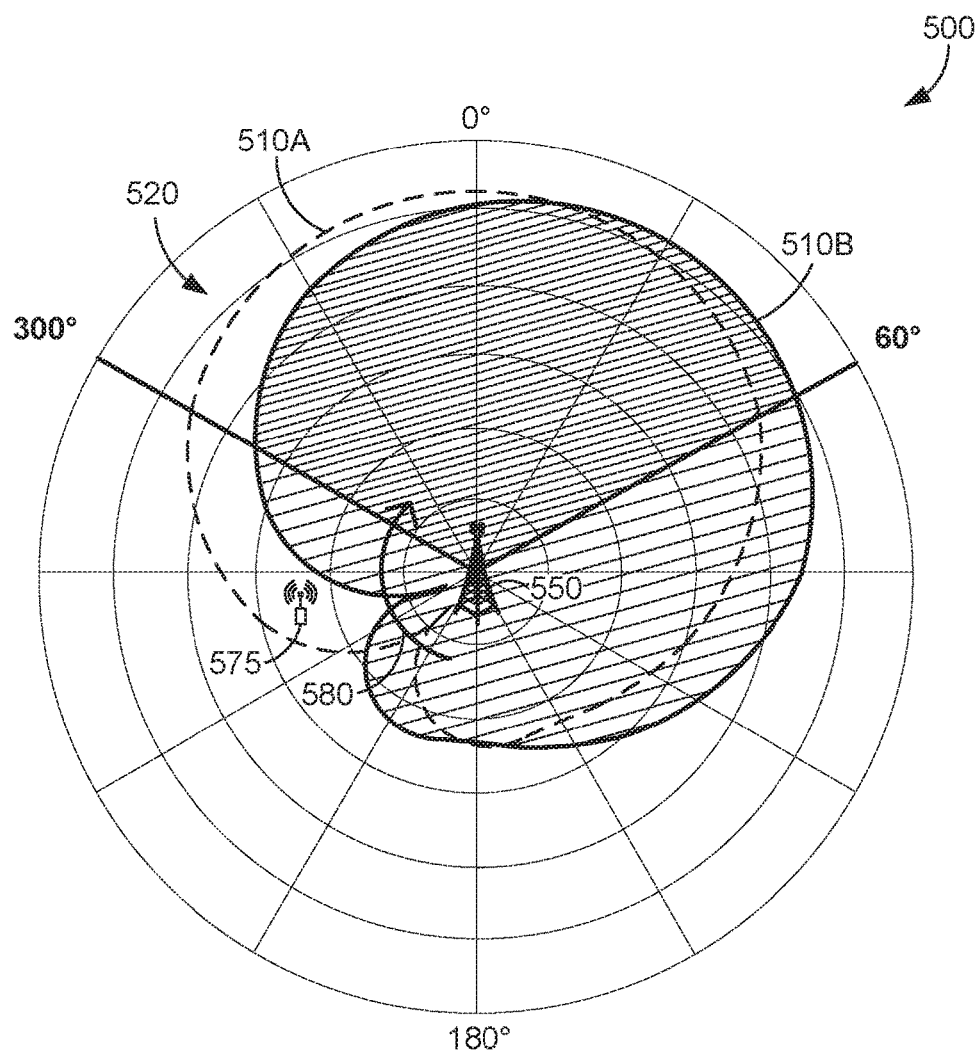
FIG. 5B depicts the shifting of the network signal footprint from FIG. 5A from the shifting of a TR component of the broadcast cell in an azimuthal direction, in accordance with aspects described herein.

Example FIGS. 5A and 5B illustrate one potential scenario in which the above-described technology can be utilized to adjust a TR component along an azimuthal direction, shifting a network signal from a first footprint to a second footprint. It should be understood that FIGS. 5A and 5B are not intended to limit the aspects provided to a particular example or scenario, but are provided to better describe the technology.

FIG. 5A depicts a first network footprint 510A emitted from a first TR component (not shown) of broadcast cell 550, when the first TR component is in a first azimuthal position. Further shown in FIG. 5A is UE 575 outside of designated coverage zone 520 but inside the first network footprint 510A. FIG. 5B provides a second network footprint 510B that is emitted from the first TR component of broadcast cell 550, when the first TR component is in a second azimuthal position. The area where the first network footprint 510A covered is shown in dashed lines in FIG. 5B as the first network footprint 510A has shifted to form the second network footprint 510B, for example, by shifting the TR component in an azimuthal direction, e.g., the azimuthal direction 580, from the first azimuthal position to the second azimuthal position. In this example, while the first TR component has shifted so that the network signal footprint is no longer coincident or overlapping with the position of the UE 575, the UE 575 may be connected to a second network signal from a second TR component associated with the broadcast cell 550 (not illustrated for clarity), which may increase the network performance of the UE 575, e.g., due to decreased intra-cell interference (or decreased overlapping coverage) from the first TR component. In various aspects, the determination to shift the TR component may be made by an EMS, such as the EMS 420 discussed above with reference to FIG. 4.

Figure 6A:
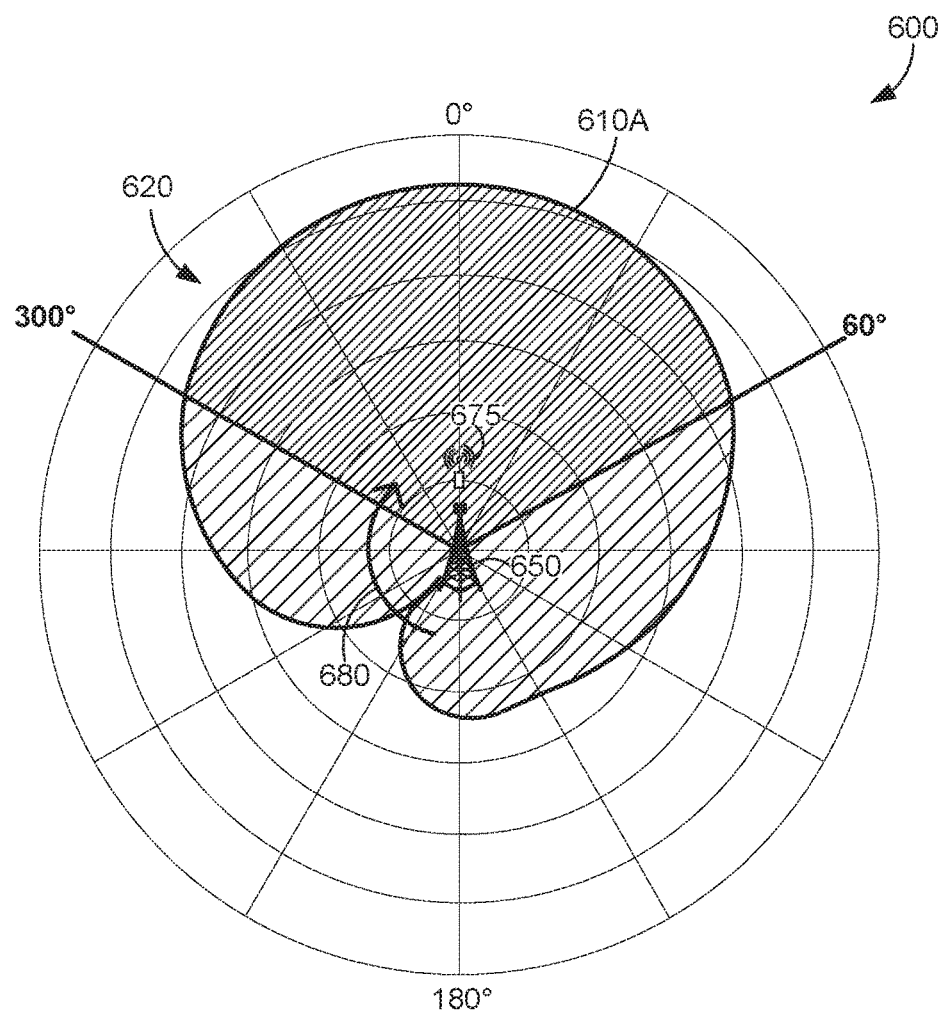
FIG. 6A depicts a network signal footprint from a broadcast cell in a wireless telecommunications network, in accordance with aspects described herein.
Figure 6B:
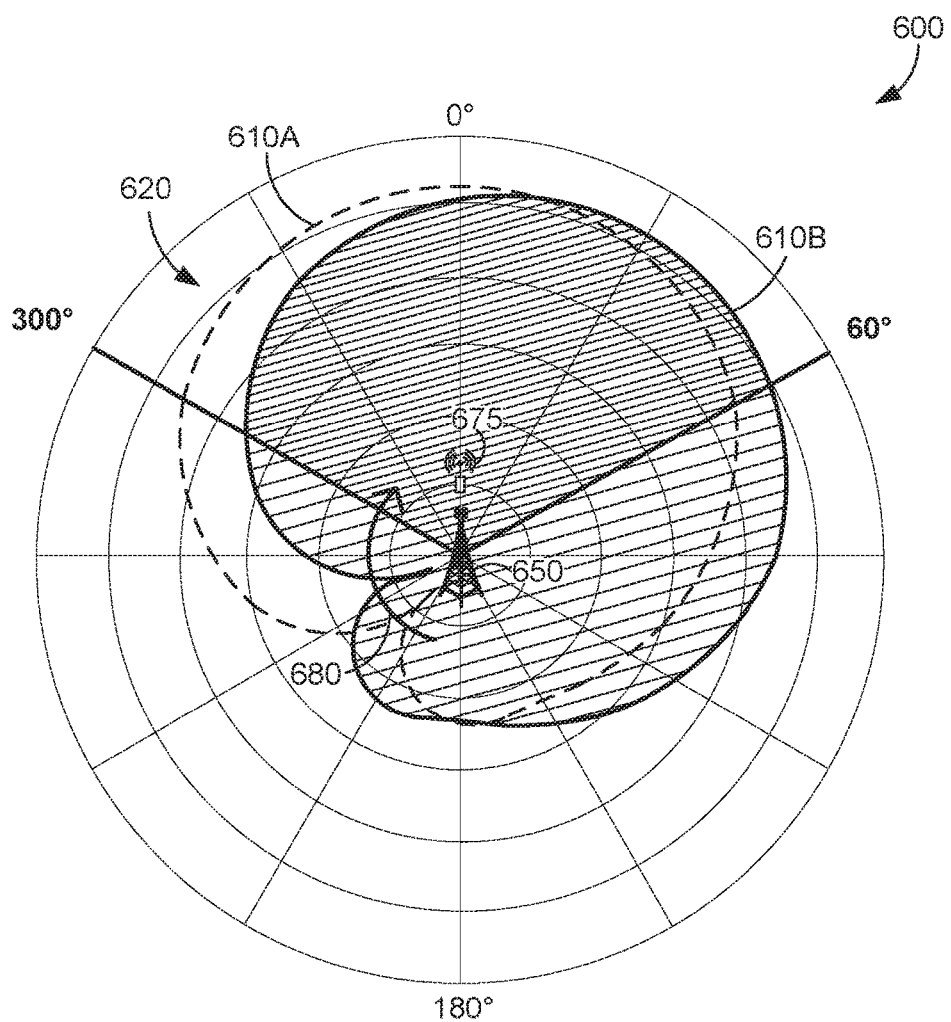
FIG. 6B depicts the shifting of the network signal footprint from FIG. 6A from the shifting of a TR component of the broadcast cell in an azimuthal direction, in accordance with aspects described herein.

FIGS. 6A and 6B depict another example of shifting a TR component along an azimuthal direction, e.g., to shift a network signal footprint. Like FIGS. 5A and 5B, FIGS. 6A and 6B are only intended to illustrate one example potential scenario in which the above-described technology may be utilized to shift a TR component in an azimuthal direction and shift a network signal from a first network footprint 610A to a second network footprint 610B. It is not intended to limit the aspects provided to a particular example or scenario, and is only provided to better describe the technology. FIGS. 6A and 6B illustrate an embodiment of the present technology where a UE 675 is located in a desired coverage area 620. A TR component (not shown) is positioned to emit the network signal so that it primarily covers the designated coverage area 620.

FIGS. 6A and 6B illustrate the shifting of the network signal from a first network footprint 610A to a second network footprint 610B. In such an aspect, the shifting of the network signal from the first network footprint 610A to the second network footprint 610B is caused by the shifting, in an azimuthal direction 680, of a TR component emitting the network signal.

As can be seen in FIG. 6B, the UE 675 is positioned within the first network footprint 610A and in the second network footprint 610B. In such an aspect, unlike in FIGS. 5A and 5B, the UE 575 may be connected to the network signal emitted by the same TR component when the TR component shifts from a first azimuthal position to a second azimuthal position. 610B. In such aspects, the shifting of the network footprint may positively affect the network performance of the UE 675 (or a plurality of UEs not depicted in FIGS. 6A and 6B). In certain aspects, the UE 675 can be a cell-near UE (or represent a plurality of cell-near UEs). In various aspects, the determination to shift the TR component may be made by an EMS, such as the EMS 420 discussed above with reference to FIG. 4.

Figure 7:
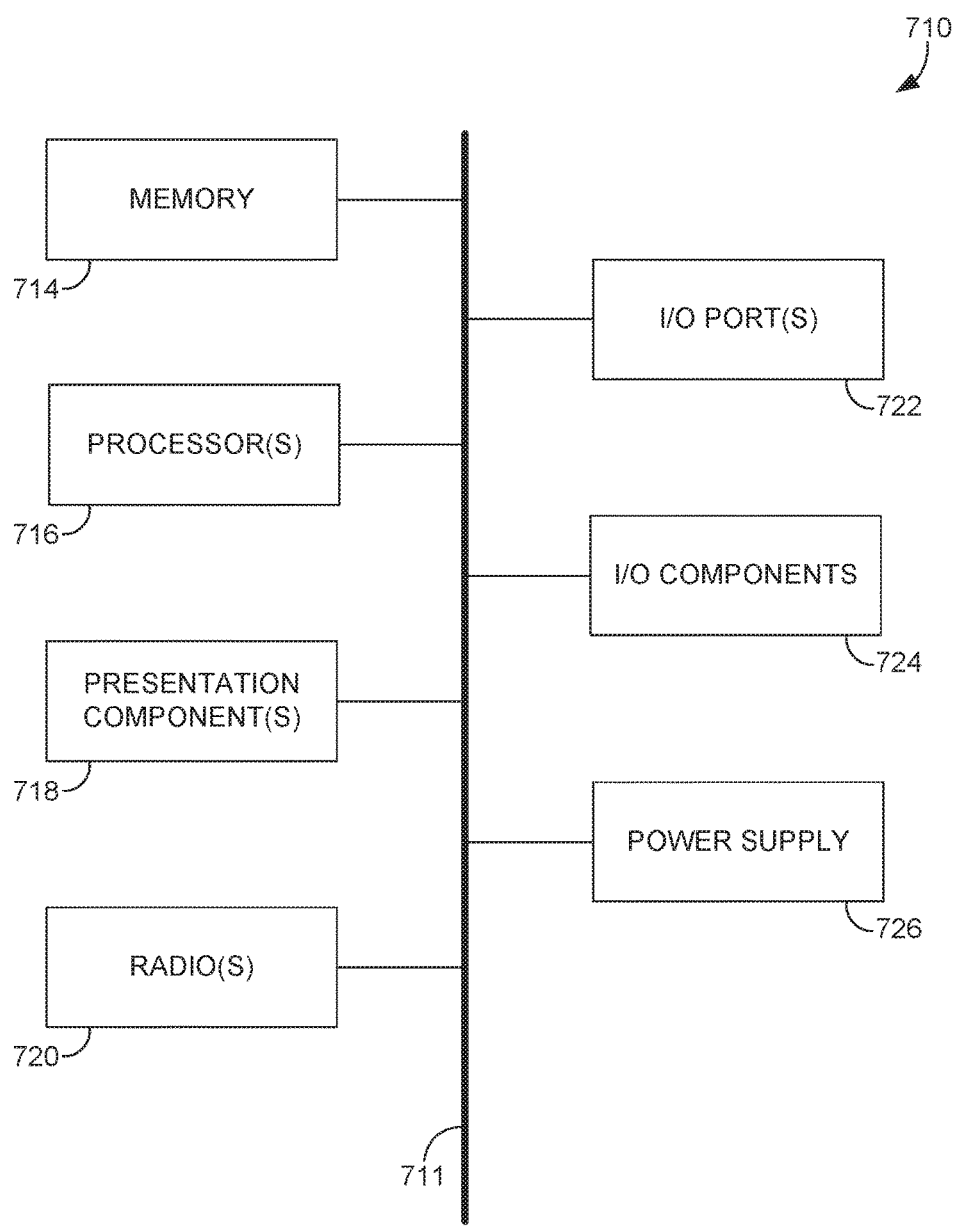
FIG. 7 depicts an example computing device, in accordance with aspects described herein.

Referring now to FIG. 7, a block diagram of an example computing device 710 for use in adjusting a network signal in a wireless telecommunications network is provided. It should be noted that although some components in FIG. 7 are shown in the singular, they may be plural. For example, the computing device 710 might include multiple processors or multiple radios. As shown in FIG. 7, computing device 710 includes a bus 711 that directly or indirectly couples various components together, including memory 714, processor(s) 716, presentation component(s) 718 (if applicable), radio(s) 720, input/output (I/O) port(s) 722, input/output (I/O) component(s) 724, and power supply 726.

Memory 714 may include any type of tangible medium that is capable of storing information, such as a database. A database may be any collection of records, data, and/or information. In one embodiment, memory 714 may include a set of embodied computer-executable instructions that, when executed, facilitate various functions or elements disclosed herein. These embodied instructions will variously be referred to as "instructions" or an "application" for short. Processor 716 may actually be multiple processors that receive instructions and process them accordingly. Presentation component 718 may include a display, a speaker, and/or other components that may present information (e.g., a screen, a lamp (LED), a graphical user interface (GUI), and/or even lighted keyboards) through visual, auditory, and/or other tactile cues.

The radio(s) 720 may facilitate communication with a network, and may additionally or alternatively facilitate other types of wireless communications, such as Wi-Fi, WiMAX, LTE, and/or other VoIP communications. In various embodiments, the radio(s) 720 may be configured to support multiple technologies, and/or multiple radios may be configured and utilized to support multiple technologies.

The input/output (I/O) port(s) 722 may take a variety of forms. Example I/O ports may include a USB jack, a stereo jack, an infrared port, a firewire port, other proprietary communications ports, and the like. Input/output (I/O) component(s) 724 may comprise keyboards, microphones, speakers, touchscreens, and/or any other item usable to directly or indirectly input data into the computing device 710.

Power supply 726 may include batteries, fuel cells, and/or any other component that may act as a power source to supply power to the computing device 710 or to other network components, including through one or more electrical connections or couplings. Power supply 726 may be configured to selectively supply power to different components independently and/or concurrently.

Figure 8:
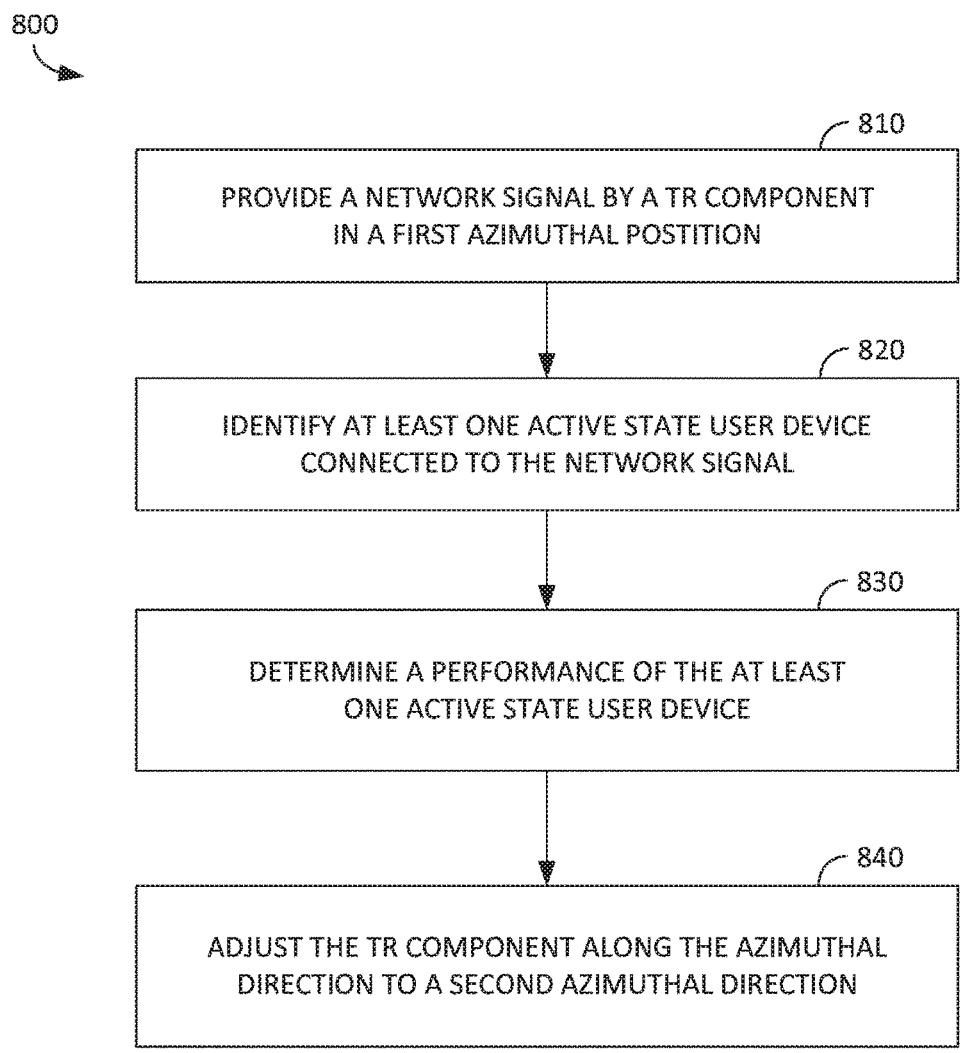
FIGS. 8 and 9 are block diagrams depicting example methods for adjusting an azimuthal setting of a TR component, in accordance with aspects described herein.

With reference now to FIG. 8, a flow diagram with an example method 800 for adjusting an azimuthal setting of a transmitting-receiving (TR) component is provided. At block 810, a network signal is provided via a TR component. In some aspects, the network signal may be provided by the TR component when the TR component is in a first azimuthal position. In some aspects, the network signal is present in a first network footprint when the network signal is provided by the TR component in the first azimuthal position. In some aspects, the first network footprint comprises a first portion, where the first portion is inside of a designated coverage zone. In some aspects, the first network footprint comprises a second portion, where the second portion is outside of the designated coverage zone. The first network footprint may have a first SPR that is defined by a ratio of the second portion to the first portion.

At block 820, at least one active state user device connected to the network signal that is provided by the TR component is identified. At block 830, a performance of the at least one active state user device is determined. In some aspects, the performance comprises one or more of a throughput and a signal-to-interference-plus-noise ratio (SINR). In some aspects, determining the performance of the at least one active state user device also comprises determining whether the throughput is below a throughput threshold value or the SINR is below an SINR threshold value.

At block 840, the TR component may be adjusted along an azimuthal direction. In some aspects, the TR component is adjusted along the azimuthal direction from the first azimuthal position to a second azimuthal position. In some aspects, the network signal emitted by the TR component, when the TR component is in the second azimuthal position may be present in a second network footprint. The second network footprint may comprise a third portion that is inside the designated coverage zone and a fourth portion that is outside of the designated coverage zone. In some aspects, the second network footprint has a second SPR that is defined by a ratio of the fourth portion to the third portion of the second network footprint. In some aspects, the throughput, the SINR, or both of the at least one active state user device are increased based on adjusting the TR component from the first azimuthal position to the second azimuthal position.

Figure 9:
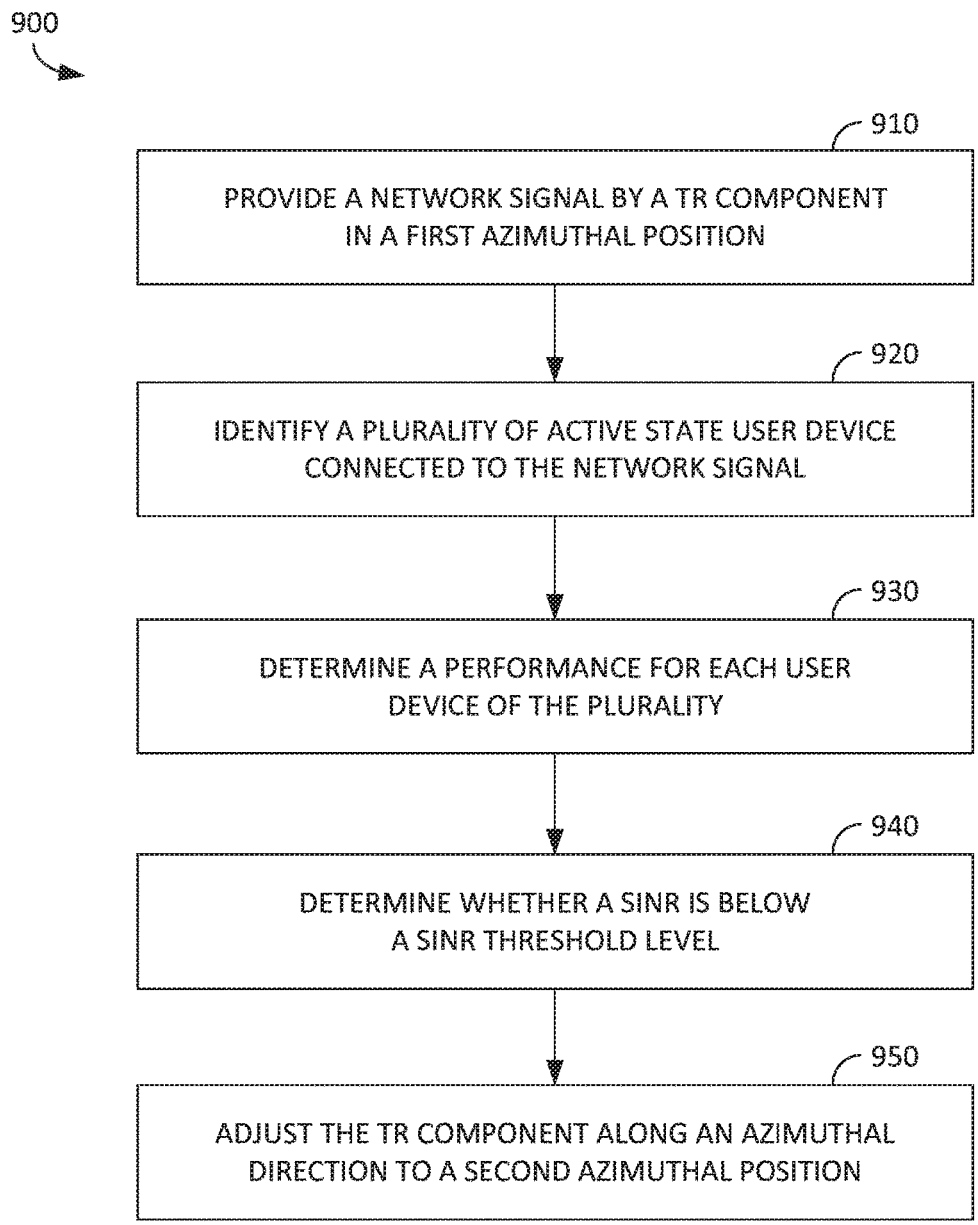

Turning now to FIG. 9, a block diagram for another example method 900 for adjusting an azimuthal setting of a sector TR component is provided. At block 910, a network signal is provided via a TR component in a first azimuthal position. In some aspects, the network signal is present in a first network footprint when the network signal is provided by the TR component in the first azimuthal position. In some aspects, the first network footprint comprises a first portion inside of a designated coverage zone and a second portion outside of the designated coverage zone. The first network footprint may have a first SPR that is defined by a ratio of the second portion to the first portion.

At block 920, a plurality of active state user devices connected to the network signal provided by the TR component is identified. At block 930, a performance for each user device of the plurality of active state user devices is determined. In some aspects, the performance may comprise an SINR. At block 940, it is determined whether the SINR is below a SINR threshold level. In some aspects, it is determined whether the SINR is below the SINR threshold level for (1) the SINR of each of the plurality of active state user devices; (2) an average SINR calculated from the SINR of each of the plurality of the active state user devices; or (3) both.

At block 950, the TR component is adjusted along an azimuthal direction to a second azimuthal position. In some aspects, the network signal may be provided by the TR component when the TR component is in the second azimuthal position. In some aspects, the network signal is present in a second network footprint when the network signal is provided by the TR component in the second azimuthal position. In some aspects, the second network footprint comprises a third portion, where the third portion is inside of the designated coverage zone. In some aspects, the second network footprint also comprises a fourth portion, where the fourth portion is outside of the designated coverage zone. The second network footprint may have a second SPR that is defined by a ratio of the fourth portion to the third portion. In some aspects, the SINR of at least a portion of user devices in the plurality of active state user devices is increased based on the TR component shifting from the first azimuthal position to the second azimuthal position.

Many different arrangements of the various components depicted and described, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described. Accordingly, the scope of the disclosure is intended to be limited only by the following claims.

What is claimed is:

1. A method of adjusting an azimuthal setting of a transmitting-receiving (TR) component, the method comprising:

providing, via a TR component in a first azimuthal position, a network signal, wherein the network signal provided by the TR component in the first azimuthal position is present in a first network footprint, the first network footprint comprising a first portion inside a designated coverage zone and a second portion outside the designated coverage zone, and wherein a ratio of the second portion to the first portion defines a first sector power ratio (SPR);

identifying at least one active state user device connected to the network signal provided by the TR component;

determining a performance of the at least one active state user device, the performance comprising one or more of a throughput and a signal-to-interference-plus-noise ratio (SINR); and in response to the determining the performance of the at least one active state user device, adjusting the TR component along an azimuthal direction to a second azimuthal position, so that the network signal provided by the TR component in the second azimuthal position is present in a second network footprint, the second network footprint comprising a third portion inside the designated coverage zone and a fourth portion outside the designated zone, wherein a ratio of the fourth portion to the third portion defines a second SPR, wherein the throughput, the SINR, or both, of the at least one active state user device is increased.

2. The method of claim 1, wherein the determining the performance of the at least one active state user device comprises determining whether the throughput is below a throughput threshold value or whether the SINR is below a SINR threshold value.

3. The method of claim 2, wherein the performance comprises the throughput, and wherein the throughput threshold value is 10 Mbps.

4. The method of claim 2, wherein the performance comprises the SINR, wherein the SINR threshold value is 20 dB.

5. The method of claim 1, wherein the second SPR is lower than the first SPR.

6. The method of claim 1, wherein the at least one active state user device is positioned within the second portion outside the designated coverage zone of the first network footprint.

7. The method of claim 1, wherein the at least one active state user device is positioned within the first portion inside a designated coverage zone of the first network footprint.

8. The method of claim 1, wherein the at least one active state user device is within a predefined area.

9. The method of claim 8, wherein the at least one active state user device within the predefined area exhibits a signal strength of −90 dBm or greater.

10. A method of adjusting an azimuthal setting of a transmitting-receiving (TR) component, the method comprising:

providing, via a TR component in a first azimuthal position, a network signal, wherein the network signal provided by the TR component in the first azimuthal position is present in a first network footprint, the first network footprint comprising a first portion inside a designated coverage zone and a second portion outside the designated coverage zone, wherein a ratio of the second portion to the first portion defines a first sector power ratio (SPR);

identifying a plurality of active state user devices connected to the network signal provided by the TR component;

determining a performance of each of the plurality of active state user devices, the performance comprising a signal-to-interference-plus-noise ratio (SINR);

determining whether: (1) the SINR of each of the plurality of active state user devices; (2) an average SINR calculated from the SINR of each of the plurality of active state user devices; or (3) both, is below an SINR threshold value;

adjusting the TR component along an azimuthal direction to a second azimuthal position, so that the network signal provided by the TR component in the second azimuthal position is present in a second network footprint, the second network footprint comprising a third portion inside a designated coverage zone and a fourth portion outside the designated coverage zone, wherein a ratio of the fourth portion to the third portion defines a second SPR, wherein the second network footprint results in an increase of the SINR of at least a portion of the plurality of the active state user devices.

11. The method of claim 10, wherein the SINR threshold value is about 15 dB.

12. The method of claim 10, wherein the performance further comprises a throughput, the method further comprising determining whether: A) the throughput of each of the plurality of the active state user devices; B) an average throughput calculated from the throughput of each of the plurality of the active state user devices; or C) both, is below a throughput threshold value.

13. The method of claim 12, wherein the throughput threshold value is about 10 Mbps.

14. The method of claim 12, wherein the second SPR is lower than the first SPR.

15. The method of claim 12, wherein the plurality of active state user devices is positioned in the first portion inside the designated coverage zone of the first network footprint when the TR component is positioned in the first azimuthal position.

16. The method of claim 15, wherein the plurality of active state user devices is positioned in the third portion inside the designated coverage zone of the second network footprint when the TR component is positioned in the second azimuthal position.

17. A system for adjusting an azimuthal setting of a transmitting-receiving (TR) component in a wireless telecommunications network, the system comprising:

a TR component adapted to be shiftable in an azimuthal direction from a first azimuthal position to a second azimuthal position, wherein, when the TR component is in the first azimuthal position, a network signal provided by the TR component is present in a first network footprint, the first network footprint comprising a first portion inside a designated coverage zone and a second portion outside the designated coverage zone, wherein a ratio of the second portion to the first portion defines a first sector power ratio (SPR), and wherein, when the TR component is in the second azimuthal position, the network signal provided by the TR component is present in a second network footprint, the second network footprint comprising a third portion inside the designated coverage zone and a fourth portion outside the designated coverage zone, and wherein a ratio of the fourth portion to the third portion defines a second SPR;

one or more processors; and non-transitory storage media storing computer-useable instructions that, when executed by the one or more processors, cause the one or more processors to:

determine a performance of at least one active state user device connected to the network signal, the performance comprising one or more of a throughput and a signal-to-interference-plus-noise ratio (SINR), determine whether the throughput is below a throughput threshold value or the SINR is below a SINR threshold value, in response to determining that the throughput is below the throughput threshold value or the SINR is below the SINR threshold value, cause the TR component to shift from the first azimuthal position to the second azimuthal position.

18. The system of claim 17, wherein the at least one active state user device is positioned in the first portion inside the designated coverage zone of the first network footprint.

19. The system of claim 17, wherein the second SPR is lower than the first SPR.

20. The system of claim 17, wherein the SINR threshold value is about 15 dB and the throughput threshold value is about 10 Mbps.

\* \* \* \* \*